(12) United States Patent
Li et al.

(10) Patent No.: US 9,033,327 B2
(45) Date of Patent: May 19, 2015

(54) ADJUSTMENT MECHANISM

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Bing Li, Shenzhen (CN); Yong Zhang, Shenzhen (CN); Bo Yang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 248 days.

(21) Appl. No.: 13/687,426

(22) Filed: Nov. 28, 2012

(65) Prior Publication Data
US 2013/0207332 A1    Aug. 15, 2013

(30) Foreign Application Priority Data

Feb. 14, 2012    (CN) .......................... 2012 1 0032301

(51) Int. Cl.
| | | |
|---|---|---|
| *B25B 1/22* | (2006.01) | |
| *B25B 1/00* | (2006.01) | |
| *B25B 1/06* | (2006.01) | |
| *B23Q 3/00* | (2006.01) | |
| *B23Q 1/25* | (2006.01) | |
| *B23Q 3/18* | (2006.01) | |
| *B23Q 1/62* | (2006.01) | |

(52) U.S. Cl.
CPC . *B23Q 3/00* (2013.01); *B23Q 1/621* (2013.01); *B23Q 1/25* (2013.01); *B23Q 3/18* (2013.01)

(58) Field of Classification Search
CPC ............ B23Q 1/40; B23Q 1/621; B23Q 1/38; B23Q 1/5443; B23Q 1/25
USPC .......... 269/73, 60, 218, 153, 71, 309, 285, 75
See application file for complete search history.

(56) References Cited

U.S. PATENT DOCUMENTS 4,934,671 A * 6/1990 Laninga et al. ................. 269/20

* cited by examiner

*Primary Examiner* — Lee D Wilson
*Assistant Examiner* — Seahee Yoon
(74) *Attorney, Agent, or Firm* — Novak Druce Connolly Bove + Quigg LLP

(57) ABSTRACT

An adjustment mechanism includes a first adjustment assembly and a second adjustment assembly. The first adjustment assembly includes a first regulating member and a second regulating member. The first regulating member includes a bearing plate and a first supporting portion protruding from the bearing plate. The first supporting portion includes an arcuate first supporting surface. The second regulating member includes a base body and a second supporting portion protruding from the base body away from the first supporting portion. The second supporting portion includes an arcuate second supporting surface. The second adjustment assembly includes a mounting member latched with the base body. First supporting surface resists the base body, to enable the bearing plate to rock along a curvature relative to the base body. Second supporting surface resists the mounting member, to enable the bearing plate and the base body to rock relative to the mounting member.

20 Claims, 4 Drawing Sheets

ADJUSTMENT MECHANISM

BACKGROUND

1. Technical Field

The present disclosure relates to adjustment mechanisms, and particularly to an adjustment mechanism capable of adjusting a plurality of degrees of freedom.

2. Description of Related Art

During automatic processes, such as automatic clamping, automatic machining, or automatic assembling, it is difficult to position a workpiece to a predetermined position due to a poor precision of a robot or a connecting mechanism, which results in producing a plurality of machining tolerances. An adjustment mechanism may be used to adjust a position of the workpieces. However, commonly-used adjustment mechanisms cannot adjust the workpieces to a plurality of degrees, and machining tolerances may also exist in the automatic processes.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
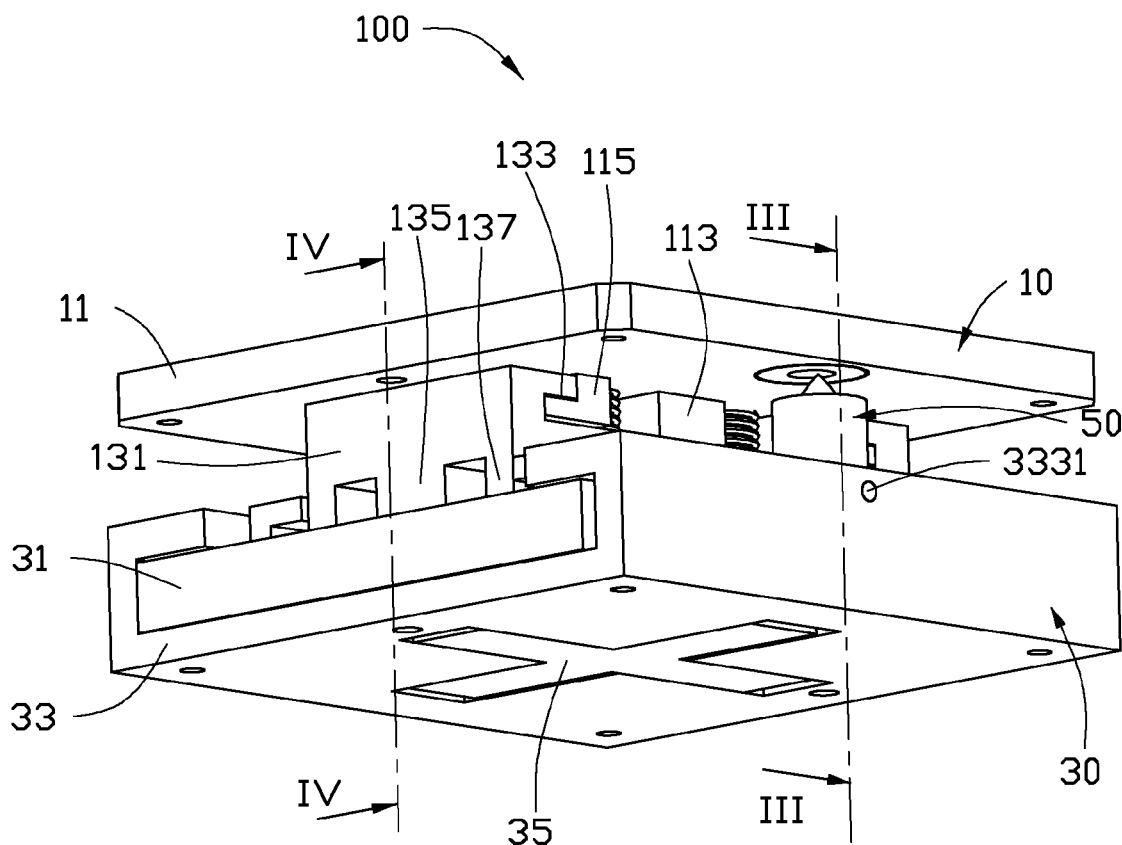
FIG. 1 is an isometric view of an adjustment mechanism according to an embodiment of present invention.
Figure 2:
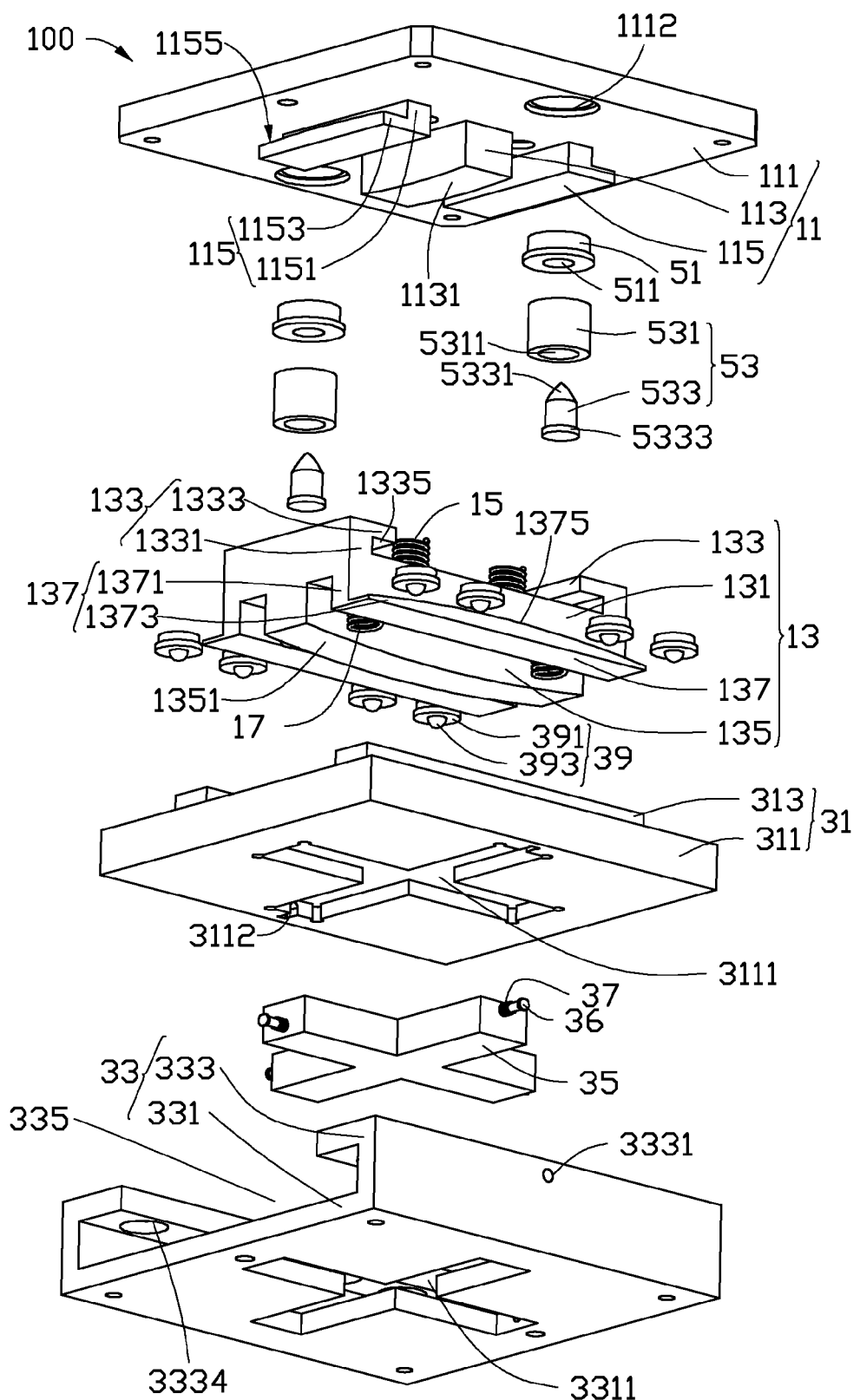
FIG. 2 is an explored, isometric view of the adjustment mechanism shown in FIG. 1.

FIGS. 1 and 2 show an embodiment of an adjustment mechanism 100. The adjustment mechanism 100 includes a first adjustment assembly 10, a second adjustment assembly 30, and a pair of positioning assemblies 50. The first adjustment assembly 10 is latched with the second adjustment assembly 30. The pair of positioning assemblies 50 are positioned between the first adjustment assembly 10 and the second adjustment assembly 30.

The first adjustment assembly 10 includes a first regulating member 11, a second regulating member 13, a plurality of first elastic members 15, and a plurality of second elastic members 17. The second regulating member 13 resists the first regulating member 11. The first elastic member 15 is positioned between the first regulating member 11 and the second regulating member 13. The second elastic member 17 is located between the second regulating member 13 and the second adjustment assembly 30.

The first regulating member 11 includes a bearing plate 111, a first supporting portion 113, and a pair of first contacting portions 115. The first supporting portion 113 is fixed on a surface of the bearing plate 111 facing the second regulating member 13. The pair of first contacting portions 115 are mounted on the surface of the bearing plate 111, and are symmetrically located at opposite sides of the first supporting portion 113.

The bearing plate 111 is substantially rectangular, and defines two receiving holes 1112 located at opposite ends of the first supporting portion 113 on the surface of the bearing plate 111 adjacent to the second regulating member 13. The first supporting portion 113 includes a first supporting surface 1131 away from the bearing plate 111 and is substantially a bar. The first supporting surface 1131 resists the second regulating member 13, and is substantially arcuate. The first supporting surface 1131 bends towards the bearing plate 111. Each first contacting portion 115 is substantially L-shaped, and is parallel to the first supporting portion 113. Each first contacting portion 115 includes a first main body 1151 and a bending portion 1153. The first main body 1151 perpendicularly protrudes from the bearing plate 111. The bending portion 1153 perpendicularly bends from the first main body 1151 away from the first supporting portion 113. The bending portion 1153 includes a first contacting surface 1155 adjacent to the bearing plate 111. The first contacting surface 1155 is a convex surface, and the first contacting surface 1155 bends towards the second regulating member 13.

The second regulating member 13 includes a base body 131, a pair of first resisting portions 133, a second supporting portion 135, and a pair of second contacting portions 137. The first resisting portions 133 perpendicularly extend from two opposite ends of a side of the base body 131 adjacent to the first regulating member 11. The second supporting portions 135 perpendicularly protrudes from an opposite side of the base body 131 away from the first regulating member 11. The second contacting portions 137 perpendicularly protrude from the base body 131, and are located at opposite sides of the second supporting portion 135.

The base body 131 is substantially cubic, and is smaller in size than the bearing plate 111. The first resisting portions 133 are substantially L-shaped, and are located at a side of the base body 131 adjacent to the bearing plate 111 corresponding to a position of the first contacting portions 115. The first resisting portions 133 are parallel to the first contacting portions 115. Each first resisting portion 133 includes a second main body 1331 and a protruding portion 1333. The second main body 1331 perpendicularly protrudes from the base body 131. The protruding portion 1333 perpendicularly protrudes from the second main body 1331 towards another first resisting portion 133. The protruding portion 1333 includes a first resisting surface 1335 adjacent to the base body 131. The first resisting surface 1335 is a planar surface. The first resisting portions 133 latch with the corresponding first contacting portion 115, and the first resisting surface 1335 resist the corresponding first contacting surface 1155.

The second supporting portion 135 perpendicularly extends from substantially a middle portion of another side of the base body 131 away from the first regulating member 11. A shape of the second supporting portion 135 is substantially the same as a shape of the first supporting portion 113, and the second supporting portion 135 is perpendicular to the first supporting portion 113. The second supporting portion 135 includes a second supporting surface 1351 away from the base body 131. The second supporting surface 1351 is substantially a convex surface, and resists the second adjustment assembly 30. The second supporting surface 1351 bends towards the second adjustment assembly 30. The second contacting portions 137 are located at a same side of the base body 131 with the second supporting portion 135, and parallel to the second supporting portion 135. Each second contacting portion 137 includes a third main body 1371 and an extending portion 1373. The third main body 1371 perpendicularly extends from the base body 131. The extending portion 1373 perpendicularly extends from the third main body 1371 away from the second supporting portion 135. The extending portion 1373 includes a second contacting surface 1375 adjacent to the base body 131. The second contacting surface 1375 is a convex surface, and the second contacting surface 1375 bends towards the first regulating member 11. In other embodiments, the second supporting portion 135 may intersect with the first supporting portion 113 at an obtuse angle or at an acute angle.

Figure 3:
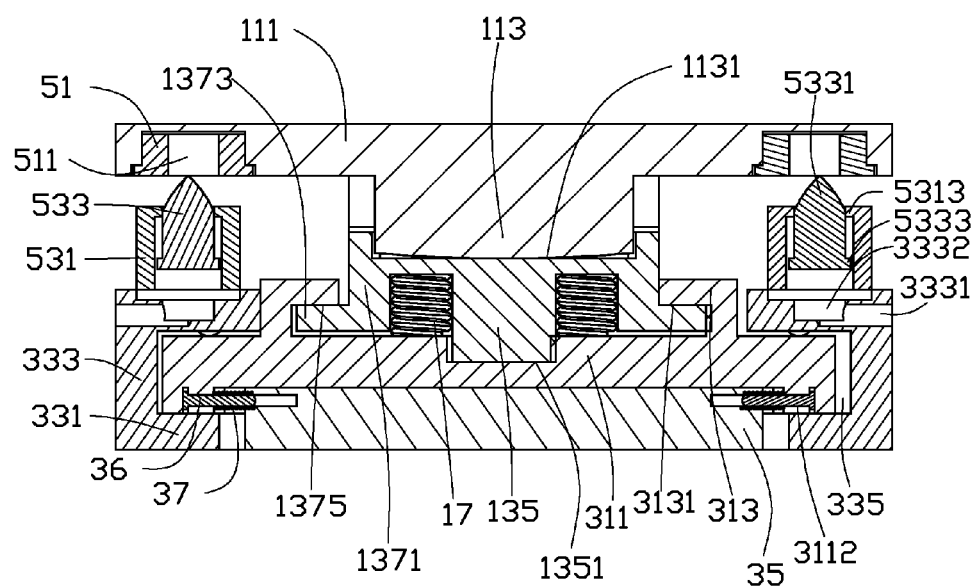
FIG. 3 is a sectional view of the adjustment mechanism taken along III-III shown in FIG. 1.
Figure 4:
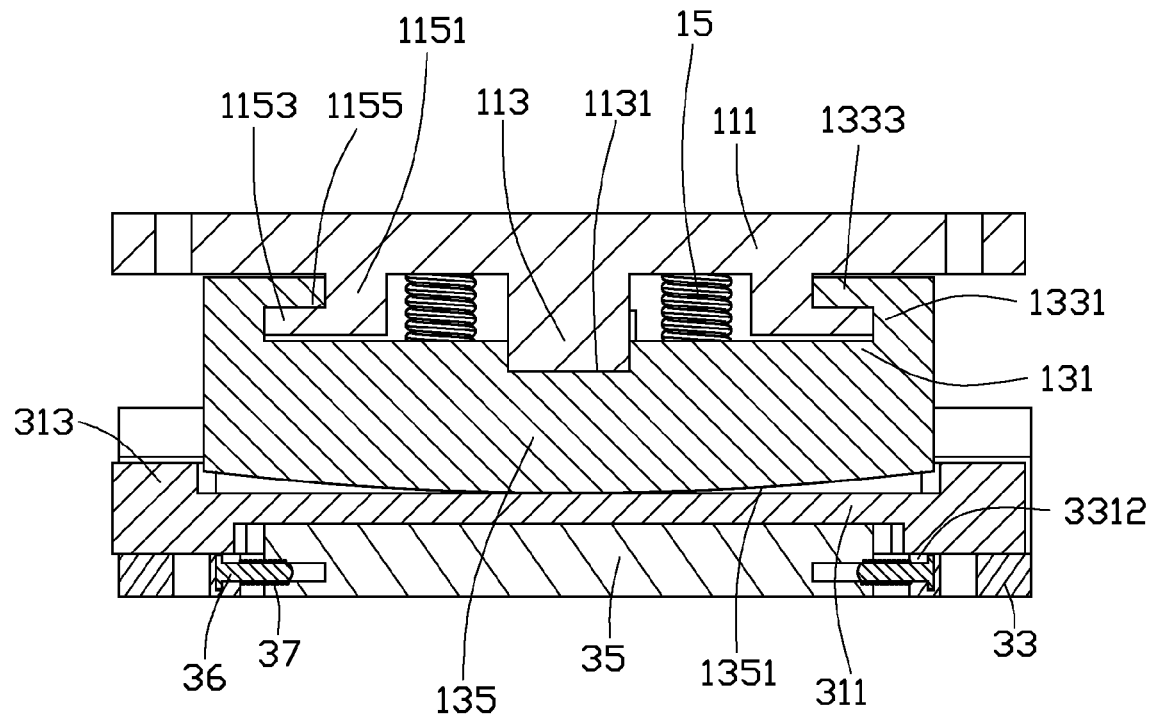
FIG. 4 is a sectional view of the adjustment mechanism taken along IV-IV shown in FIG. 1.

FIGS. 3 and 4 show a second adjustment assembly 30 located at a side of the second regulating member 13 away from the first regulating member 11. The second adjustment assembly 30 includes a mounting member 31, a fixing member 33, an adjustment member 35, two pairs of connecting members 36, two pairs of elastic members 37, and four rolling members 39. The mounting member 31 includes a base plate 311 and a pair of second resisting portions 313 fixed on the base plate 311 adjacent to the second regulating member 13.

The base plate 311 is substantially rectangular, and defines a cross-shaped first receiving groove 3111 at a substantially middle portion thereof. The first receiving groove 3111 includes two bar-type receiving grooves crossed each other, in which one bar-type receiving groove is parallel to the first supporting portion 113 and another one bar-type receiving groove is parallel to the second supporting portion 135. Two ends of the bar-type receiving groove parallel to the first supporting portion 113 each defines a first latching end 3112. The first latching end 3112 is a groove of substantially T-shaped cross-section. Sizes of the second resisting portions 313 are substantially the same as the sizes of the first resisting portions 133, and the second resisting portions 313 are parallel to the second contacting portions 137. Each second resisting portion 313 includes a second resisting surface 3131 adjacent to the base plate 311. The second resisting surface 3131 is substantially a planar surface. The second resisting portions 313 latch with the second contacting portions 137, and the second resisting surfaces 3131 resist the corresponding second contacting surface 1375.

The fixing member 33 is located at a side of the mounting member 31 away from the second regulating member 13, and includes a supporting plate 331 and a pair of fixing portions 333 protruding from two opposite ends of the supporting plate 331. The supporting plate 331 defines a second receiving groove 3311 corresponding to the first receiving groove 3111. A shape of the second receiving groove 3311 is substantially the same as that of the first receiving groove 3111. The second receiving groove 3311 includes two bar-type receiving grooves crossing each other, in which one bar-type receiving groove is parallel to the first supporting portion 113 and another one bar-type receiving groove is parallel to the second supporting portion 135. Two ends of the bar-type receiving groove parallel to the second supporting portion 135 define a second latching end 3312 (see FIG. 4), respectively. A shape of the second latching end 3312 is substantially the same as a shape of the first latching end 3112. The fixing portions 333 are substantially L-shaped, and define a receiving chamber 335 cooperating with the supporting plate 331. Each fixing portion 333 defines an air inlet hole 3331 at a side thereof away from another fixing portion 333, and defines a first mounting hole 3332 (see FIG. 3) and two second mounting holes 3334 at a surface of the fixing portion 333 away from the supporting plate 331. The two second mounting holes 3334 are located at opposite sides of the first mounting hole 3332. The air inlet hole 3331 communicates with the first mounting hole 3332. The mounting member 31 is received in the receiving chamber 335.

The adjustment member 35 is substantially a cross-shaped article, and is smaller in size than the first receiving groove 3111 and the second receiving groove 3311, respectively, and a height of the adjustment member 35 is equal to a depth of the first receiving groove 3111 adding to a depth of the second receiving groove 3311. The connecting members 36 are mounted on four ends of the adjustment member 35, respectively. Each connecting member 36 is substantially a rod, and an end thereof is T-shaped corresponding to the first latching end 3112 and the second latching end 3312. An end of each of the four connecting members 36 away from the T-shaped end thereof is movably latched with a corresponding end of the adjustment member 35, and the T-shaped end is received in the corresponding first latching end 3112 or the corresponding second latching end 3312. In the illustrated embodiment, the connecting members 36 are screws.

The four elastic members 37 are sleeved on the four connecting members 36, respectively. The rolling members 39 are mounted between the mounting member 31 and the fixing member 33. Each rolling member 39 includes a main body 391 and a ball 393 movably mounted on the main body 391 adjacent to the mounting member 31. The main body 391 is fixed within the corresponding second mounting hole 3334, and the ball 393 resists the base plate 311.

The first elastic members 15 are sandwiched between the bearing plate 111 and the base body 131, and are positioned between the pair of first resisting portions 133 located at opposite sides of the first supporting portion 113. The second elastic members 17 are sandwiched between the base body 131 and the base plate 311, and are positioned between the pair of second resisting portions 313 at opposite sides of the second supporting portion 135. In the illustrated embodiment, the first elastic members 15 and the second elastic members 17 are springs, and there are four first elastic members 15 and four second elastic members 17 in total.

The pair of positioning assemblies 50 are located at two opposite sides of the second regulating member 13. Each positioning assembly 50 includes a latching member 51 and an engaging member 53 latched with the latching member 51. The latching member 51 is substantially a cylindrical body having a flange, and is received in the receiving hole 1112. The latching member 51 defines a latching hole 511 along an axis of the latching member 51. The engaging member 53 is fixed on the fixing member 33. The engaging member 53 includes a receiving portion 531 and an engaging portion 533 received in the receiving portion 531. The receiving portion 531 is substantially a cylindrical body, and defines a receiving hole 5311 along an axis of the receiving portion 531. The receiving portion 531 includes a first resisting end 5313 away from the fixing member 33. The first resisting end 5313 protrudes from an edge of the receiving portion 531 towards the axis of the receiving portion 531. The engaging portion 533 includes an engaging end 5331 away from the fixing member 33, and a second resisting end 5333 adjacent to the fixing member 33 corresponding to the first resisting end 5313. The engaging end 5331 is substantially conic. The second resisting end 5333 is substantially a flange.

In assembly, the elastic members 37 are sleeved on the corresponding connecting member 36, and the connecting members 36 are latched with the ends of the adjustment member 35, respectively. The adjustment member 35 is received into the first receiving groove 3111 and the second receiving groove 3311, and the connecting members 36 are respectively received in the first latching ends 3112 or the second latching ends 3312. The engaging members 53 are mounted in the first mounting holes 3332, and then the second elastic members 17 are positioned at opposite sides of the second supporting portion 135. The second regulating member 13 is positioned above the mounting member 31, and the second contacting portions 137 are latched with the second resisting portions 313, and the second supporting portion 135 resists the base plate 311. The rolling members 39 are mounted on the base plate 311, and positioned at opposite sides of the second resisting portion 313. The first elastic member 15 is mounted between the first resisting portions 133. The latching members 51 are fixed within the receiving holes 1112. The first regulating member 11 is positioned above the second regulating member 13, and the first contacting portion 115 is latched with the first resisting portion 133, and the first supporting portion 113 resists the base body 131.

In use, a workpiece (not shown) is put or placed on a surface of the bearing plate 111 away from the second regulating member 13, to enable a robot (not shown) to machine the workpiece. Because of the presence of an error of the robot and/or an error of the positioning of the workpiece, a machining deviation thereby may be resulted. The adjustment mechanism 100 is configured to overcome the machining deviation.

When the bearing plate 111 is forced or pushed by the workpiece to move along a vertical direction towards the second regulating member 13, the bearing plate 111 tends to incline relative to the base body 131. The first supporting portion 113 and the base body 131 are making a higher pair joint, and the first contacting portions 115 and the first resisting portions 133 are making a higher pair joint, which enables the bearing plate 111 to rock along a curvature defined by an arcuate surface in a direction of the first supporting surface 1131 relative to the base body 131. The second supporting member 135 and the base plate 311 are making a higher pair joint, and the second contacting portions 137 and the second resisting portions 313 are making a higher pair joint, which enable the bearing plate 111 to rock along a curvature of the arcuate surface of the second supporting surface 1351 relative to the base plate 311. When the workpiece releases the force acting to the bearing plate 111, the first elastic members 15 and the second elastic members 17 are recovered to their original state, and the bearing plate 111 and the base body 131 are also recovered to their original state.

When the bearing plate 111 is forced by the workpiece acting along a coplanar direction with the bearing plate 111, the bearing plate 111 tends to deviate relative to the base body 131. The adjustment member 35 is movably latched with the mounting member 31 and the fixing member 33, which thereby enable the bearing plate 111, the base body 131, and the mounting member 31 to deviate in position relative to the fixing member 33. During the deviation of the positions of various of the aforementioned parts of the adjustment mechanism, the rolling members 39 roll relative to the fixing member 33. When the workpiece releases the coplanar force acting on the bearing plate 111, the elastic members 37 is recovered to original state, and the bearing plate 111, the base body 131, and the mounting member 31 are also recovered to their original state.

When the bearing plate 111 is adjusted to a precise position. Because of the presence of the elastic forces of the first elastic member 15, the second elastic member 17, and the elastic member 37, the bearing plate 111 may be thereby vibrated. To overcome the vibration of the bearing plate 111, air is fed into the first mounting hole 3332 from the air inlet hole 3331, to drive the engaging portion 533 to move towards the latching hole 511 until the engaging end 5331 is inserted into the latching hole 511. The first resisting end 5313 resists the second resisting end 5333, to stop the engaging end 5331 from moving. Thus the bearing plate 111 is appropriately positioned, and the vibration is overcome.

It is believed that the present embodiments and their advantages will be understood from the foregoing description, and it will be apparent that various changes may be made thereto without departing from the spirit and scope of the embodiments or sacrificing all of its material advantages.

What is claimed is:

1. An adjustment mechanism, comprising:
  a first adjustment assembly, comprising:
    a first regulating member comprising a bearing plate and a first supporting portion protruding from the bearing plate, the first supporting portion comprising a first supporting surface, the first supporting surface is substantially arcuate;
    a second regulating member comprising a base body and a second supporting portion protruding from the base body away from the first supporting portion, the second supporting portion comprising a second supporting surface, the second supporting surface is an arcuate surface;
    a plurality of first elastic members positioned between the first regulating member and the second regulating member; and
    plurality of second elastic members, and
  a second adjustment assembly comprising a mounting member latched with the base body of the second regulating member, the plurality of second elastic members positioned between the second regulating member and the mounting member.
  wherein the first supporting surface resists the base body, to enable the bearing plate to rock along a curvature of the first supporting surface relative to the base body, the second supporting surface resists the mounting member, to enable the bearing plate and the base body to rock along a curvature of the second supporting surface relative to the mounting member.

2. The adjustment mechanism of claim 1, wherein the first regulating member further comprises a pair of first contacting portions fixed on the bearing plate, and located at opposite sides of the first supporting portion, the second regulating member further comprises a pair of first resisting portions mounted on the base body corresponding to the pair of first contacting portions, the pair of first contacting portions are respectively latched with one corresponding first resisting portion.

3. The adjustment mechanism of claim 2, wherein the first contacting portions parallel to the first supporting portions, each first contacting portion comprises a first main body and a bending portion perpendicularly extending from the first main body away from the first supporting portion, the bending portion comprises a first contacting surface adjacent to the bearing plate, the first contacting surface is a convex surface, the first resisting portion comprises a first resisting surface adjacent to the base body, the first contacting surface resists the first resisting surface.

4. The adjustment mechanism of claim 1, wherein the second regulating member further comprises a pair of second contacting portions mounted on the base body away from the first regulating member, and located at opposite sides of the second supporting portion, the mounting member comprises a base plate and a pair of second resisting portions mounted on the base plate corresponding to the pair of second contacting portions, the second contacting portions are latched with the second resisting portions.

5. The adjustment mechanism of claim 4, wherein the second contacting portions are parallel to the second supporting portion, each second contacting portion comprises a third main body and an extending portion perpendicularly extending from the third main body, the extending portion comprises a second contacting surface adjacent to the third main body, the second contacting surface is a convex surface, the second resisting portion comprises a second resisting surface adjacent to the base plate, the second contacting surface resists the second resisting surface.

6. The adjustment mechanism of claim 1, wherein the second adjustment assembly further comprises a fixing member and an adjustment member, the mounting member is received in the fixing member, the adjustment member is positioned between the fixing member and the mounting member.

7. The adjustment mechanism of claim 6, wherein the mounting member defines a cross-shaped first receiving groove at a surface thereof adjacent to the fixing member, the fixing member defines a cross-shaped second receiving groove at a surface thereof adjacent to the mounting member, the first receiving groove overlaps with the second receiving groove, the adjustment portion is a cross, and is received in the first receiving groove and the second receiving groove.

8. The adjustment mechanism of claim 7, wherein the second adjustment assembly further comprises two pairs of connecting members and two pair of elastic members, each elastic member is respectively sleeved on one corresponding connecting member, one pair of connecting members are movably latched with two opposite ends of the adjustment member and the fixing member, respectively, and another pair of connecting members are movably latched with another two opposite ends of the adjustment member and the mounting member, respectively.

9. The adjustment mechanism of claim 8, wherein the second adjustment assembly further comprises a plurality of rolling members mounted between the fixing member and the mounting member.

10. The adjustment mechanism of claim 6, wherein the adjustment mechanism further comprises a positioning assembly, the position assembly comprises a latching member and an engaging member latched with the latching member, the latching member is mounted on the bearing plate, the engaging member is fixed on the fixing member, the latching member defines a latching hole, the engaging portion comprises an engaging end, the engaging end is a conic, the latching member is latched in the latching hole.

11. An adjustment mechanism, comprising:
a first adjustment assembly, comprising:
a first regulating member; and
a second regulating member latched with the first regulating member, and comprising a base body and a second supporting portion protruding from the base body away from the first regulating member, the second supporting portion comprising an arcuate second supporting surface, and
a second adjustment assembly comprising:
a mounting member latched with the base body, and defining a cross-shaped first receiving groove;
a fixing member latched with the mounting member, and defining a cross-shaped second receiving groove overlapping with the first receiving groove;
a cross-shaped adjustment member received in the first receiving groove and the second receiving groove;
a pair of first connecting members, one of the pair of first connecting members movably latched with a first end of the adjustment member and the fixing member, another one of the pair of first connecting members movably latched with an end of the adjustment member opposite to the first end of the adjustment member and the fixing member;
a pair of second connecting members, one of the pair of second connecting members movably latched with a second end of the adjustment member and the mounting member, another one of the pair of second connecting members movably latched with an end of the adjustment member opposite to the second end of the adjustment member and the mounting member,
wherein the second supporting surface resists the mounting member, to enable the base body to rock along an arcuate curvature of the second supporting surface relative to the mounting member, the mounting member is capable of moving relative to the fixing member via the adjustment member.

12. The adjustment mechanism of claim 11, wherein the first regulating member comprises a bearing plate and a first supporting portion protruding from the bearing plate, the first supporting portion comprises an arcuate first supporting surface, the first supporting surface resists the base body, to enable the bearing plate to rock along an arcuate curvature of the first supporting surface relative to the base body.

13. The adjustment mechanism of claim 12, wherein the first regulating member further comprises a pair of first contacting portions fixed on the bearing plate, and located at opposite sides of the first supporting portion, the second regulating member further comprises a pair of first resisting portions mounted on the base body corresponding to the pair of first contacting portions, each first contacting portion comprises a first contacting surface adjacent to the bearing plate, the first contacting surface is a convex surface, the first contacting surface resists one corresponding first resisting portion.

14. The adjustment mechanism of claim 11, wherein the second regulating member further comprises a pair of second contacting portions mounted on the base body away from the first regulating member, and located at opposite sides of the second supporting portion, the mounting member comprises a base plate and a pair of second resisting portions mounted on the base plate corresponding to the pair of second contacting portions, each second contacting portion comprises a second contacting surface, the second contacting surface is a convex surface, the second contacting surface resists the corresponding second resisting portion.

15. The adjustment mechanism of claim 11, wherein the first adjustment assembly further comprises a first elastic member and a second elastic member, the first elastic member is positioned between the first regulating member and the second regulating member, the second elastic member is positioned between the second regulating member and the mounting member.

16. The adjustment mechanism of claim 12, wherein the first receiving groove comprises two bar-type receiving grooves that are crossed each other, and one bar-type receiving groove parallel to the first supporting portion and another one bar-type receiving groove parallel to the second supporting portion, two ends of the bar-type receiving groove parallel to the first supporting portion each defines a first latching end, respectively, the first latching end is a groove of substantially T-shaped cross-section, each first connecting member comprises a T-shaped end, the T-shaped end of the first connecting member is received in one corresponding first latching end.

17. The adjustment mechanism of claim 12, wherein the second receiving groove comprises two bar-type receiving grooves crossed each other, and one bar-type receiving groove parallel to the first supporting portion and another one bar-type receiving groove parallel to the second supporting portion, two ends of the bar-type receiving groove parallel to the second supporting portion define a second latching end, respectively, each second connecting member comprises a T-shaped end, the T-shaped end of the second connecting member is received in one corresponding second latching end.

18. The adjustment mechanism of claim 11, wherein the second adjustment assembly further comprises two pair of elastic members, and a plurality of rolling members, one pair of elastic members is sleeved on the corresponding first connecting member, another pair of elastic members is sleeved on the corresponding second connecting member, the plurality of rolling members are mounted between the fixing member and the mounting member.

19. The adjustment mechanism of claim 11, wherein the adjustment mechanism further comprises a positioning assembly, the position assembly comprises a latching member and an engaging member latched with the latching member, the latching member is mounted on the bearing plate, the engaging member is fixed on the fixing member, the latching member defines a latching hole, the engaging portion comprises a engaging end, the engaging end is a conic, the latching member is latched in the latching hole.

20. An adjustment mechanism, comprising:
   a first adjustment assembly, comprising :
      a first regulating member comprising a bearing plate and a first supporting portion protruding from the bearing plate, the first supporting portion comprising a first supporting surface, the first supporting surface is substantially arcuate, a pair of first contacting portions fixed on the bearing plate and located at opposite sides of the first supporting portion; and
   a second regulating member comprising a base body and a second supporting portion protruding from the base body away from the first supporting portion, the second supporting portion comprising a second supporting surface, the second supporting surface is an arcuate surface, a pair of first resisting portions mounted on the base body corresponding to the pair of first contacting portions, the pair of first contacting portions respectively latched with one corresponding first resisting portion, and
   a second adjustment assembly comprising a mounting member latched with the base body of the second regulating member,
   wherein the first supporting surface resists the base body, to enable the bearing plate to rock along a curvature of the first supporting surface relative to the base body, the second supporting surface resists the mounting member, to enable the bearing plate and the base body to rock along a curvature of the second supporting surface relative to the mounting member.

\* \* \* \* \*